United States Patent
Chang et al.

(10) Patent No.: US 7,363,030 B2
(45) Date of Patent: *Apr. 22, 2008

(54) ESTABLISHING A CONFERENCE CALL FROM A CALL-LOG

(75) Inventors: E-Lee Chang, Mableton, GA (US);
Darryl Cynthia Moore, Conyers, GA (US); Hong Thi Nguyen, Atlanta, GA (US); Linda Ann Roberts, Decatur, GA (US); Sharon E. Carter, Austell, GA (US)

(73) Assignee: Phase Systems LLC, Wilmington, DE (US)

( * ) Notice: Subject to any disclaimer, the term of this patent is extended or adjusted under 35 U.S.C. 154(b) by 418 days.

This patent is subject to a terminal disclaimer.

(21) Appl. No.: 10/852,528

(22) Filed: May 24, 2004

(65) Prior Publication Data

US 2004/0214558 A1  Oct. 28, 2004

Related U.S. Application Data

(63) Continuation of application No. 10/025,722, filed on Dec. 19, 2001, now Pat. No. 6,754,323.

(51) Int. Cl.
*H04M 1/66* (2006.01)
*H04M 3/42* (2006.01)

(52) U.S. Cl. .................................. 455/416; 379/202.01

(58) Field of Classification Search ................. 455/416; 379/201.01
See application file for complete search history.

(56) References Cited

U.S. PATENT DOCUMENTS

| | | | |
|---|---|---|---|
| 5,559,876 A | 9/1996 | Alperovich | 379/205 |
| 5,631,904 A | 5/1997 | Fitser et al. | 370/261 |
| 5,848,132 A | 12/1998 | Morley et al. | 379/88 |
| 5,909,487 A | 6/1999 | Mainker | 379/209 |
| 5,940,488 A | 8/1999 | DeGrazia et al. | 379/201 |
| 5,995,608 A | 11/1999 | Detampel, Jr. et al. | 379/205 |
| 6,038,304 A | 3/2000 | Hart | 379/202 |
| 6,047,054 A | 4/2000 | Bayless et al. | 379/202.01 |
| 6,148,068 A | 11/2000 | Lowery et al. | 379/202 |
| 6,181,786 B1 | 1/2001 | Detampel, Jr. et al. | 379/205 |
| 6,192,119 B1 | 2/2001 | Wilson | 379/202 |
| 6,275,575 B1 | 8/2001 | Wu | 379/202.1 |
| 6,282,278 B1 | 8/2001 | Doganata et al. | 379/202 |
| 6,801,610 B1 * | 10/2004 | Malik | 379/202.01 |

* cited by examiner

*Primary Examiner*—Rasha S. Al-Aubaidi
(74) *Attorney, Agent, or Firm*—Connolly Bove Lodge & Hutz LLP

(57) ABSTRACT

A method for automatically establishing a conference call. The method includes viewing numbers associated with a call log feature of a communication device, selecting desired invitees from the call log using a select key, and conferencing desired invitees together by activating a key. Conference call set-up and connect information may be provisioned in a variety of ways, including via a menu-based dual tone multiple frequency (DTMF) mechanism and via a form or formatted file sent from a subscriber. The present method queries a profile database and will connect invitees to a conference based on the directory number associated with the call-log. A method for aiding a subscriber in establishing an automatic conference call that is easy to use and does not require invitee action to connect to a conference bridge.

34 Claims, 10 Drawing Sheets

| Conference Name | Conference Identifier | Start Date | Set Up Time | Start Time | Number of Participants (N) | $P_1$ | $P_2$ | ... | $P_N$ |
|---|---|---|---|---|---|---|---|---|---|
| 405 | 410 | 420 | 430 | 440 | 450 | | 460 | | |

*FIG. 4.*

ESTABLISHING A CONFERENCE CALL FROM A CALL-LOG

RELATED APPLICATION

This application is a continuation of U.S. patent application Ser. No. 10/025,722, entitled "Establishing a Conference Call from a Call-Log," filed Dec. 19, 2001 now U.S. Pat. No. 6,754,323, said application incorporated herein by reference. United States Utility Patent Application by Hong Thi Nguyen et al. Ser. No. 10/028,958, filed on the same date as this application and entitled "CONFERENCE CALL SET-UP AUTOMATION," is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to the field of telecommunications. The present invention relates specifically to systems and methods for placing an automated conference call from a call-log.

BACKGROUND

As telecommunications systems advance, demand increases for subscriber features in both wireless and wire line networks. One example of a subscriber feature that is commonly used is conference calling. Private parties and corporations frequently encounter situations in which a meeting between geographically separated parties would be appropriate, but there are difficulties associated with bringing the parties together at a specific meeting place at a specific date and time. Conference calling provides a convenient solution by allowing individuals from various geographic locations to have a conference over the telephone.

Conventional three-way conference calling enables one party already established in a telephone call with a second party to place a telephone call to a third party, and then to conference the two separate telephone calls together into a single, three-way telephone-call. To enable parties having only one telephone line to initiate a three-way conference call, the two separate telephone calls are conventionally conferenced at a telephone switch, either at the subscriber's premises or at the central office of the telephone company, and then transmitted to the initiating party on the single telephone line. Typically, at least one of the parties involved in the conference call subscribes to three-way calling service.

Conventionally, such a call is accomplished by the first party flashing the telephone line to indicate to the switch that the current party (second party) is to be put on hold, and a dial tone is to be presented to the first party. The first party then dials out to or calls a third party, and establishes a call between them. The first party then flashes the telephone line again to indicate to the switch to conference together the telephone call to the second party with the call to the third party, and to present the same to the first party as a single telephone call. Thus, a three-way call is established. This conventional technique of three-way calling is sometimes inconvenient to establish and is limited to three party participation.

An additional conventional system for establishing conference calls, usually used by businesses, involves a caller contacting a conference call operator in advance of a meeting to set-up a conference bridge. After the conference bridge is set-up, the call organizer is given a contact number, which the conference parties have to use to call in to the bridge. The call organizer then needs to communicate the contact numbers and the conference call date and time to all invitees. Each invitee is then required to dial the contact number at the specified time to join the conference call, which may already be in progress. This system has several disadvantages such as individual participants having to remember the specific date, time, and number to call in to connect to the conference call. This system also involves the conference organizer having to call an operator in advance of the conference call to set-up a conference bridge.

Sometimes, a conventional conferencing user either forgets to call at the appropriate time or forgets the conference telephone number or passcode. Such a forgetful user is penalized by being precluded from attending a conference session. A conventional conference participant may compensate by writing the conference telephone number and passcode down and posting that information near a telephone. This, however, defeats the security aspect of requiring knowledge of a telephone number and confidential passcode to access a teleconference.

Another disadvantage of conventional teleconference methods is that conference participants must initiate the conference connection. With the exception of three-way calling, conferencing requires each party to place a call to a conferencing facility that houses a conference switch. The switch is then set-up at the conferencing facility to enable the conference participants to talk among themselves.

Yet another disadvantage of certain conventional teleconference systems, particularly those in which participants are called by another participant, is that many such systems require a conference participant to be associated with one particular telephone number. Workers of today operate in a very mobile society. They may be at the office one day, and telecommuting from home the next day. Therefore, being tied to one telephone number can be very restrictive for today's worker.

What is needed are methods and systems that overcome the disadvantages of conventional systems. Such methods and systems should provide additional advantages, including cost effectiveness, flexibility, and ease of implementation.

BRIEF SUMMARY

In a preferred embodiment, the present invention provides for the automated establishment of a conference call in which conference participants are connected to the conference call by accessing and selecting participant directory numbers associated with a call-log of a subscribers' communication device. Implementations of the present invention comprise at least one of a method, a process, a system, an apparatus, a computer readable medium, and a data stream.

An embodiment of the present invention provides a method of automatically establishing a conference, comprising the steps of selecting desired conference call participants from a call-log associated with a communication device, activating a key operable for initiating the automatic service, receiving conference logistics, receiving participant profile data, allocating a conference bridge port in accordance with the received conference logistics, and connecting a communications switch port to the allocated conference bridge port. Conference logistics may include a conference start date and connect time, which may be utilized in establishing a conference. Establishing a conference includes allocating bridge ports and connecting communications switch ports with allocated bridge ports.

Embodiments of the present invention provide a teleconference participant with the flexibility to be connected at the participant's listed call-log number. The present invention is able to locate the current situs of a participant via a profile record based on the recorded call-log directory number, which includes a telephone number for the current location of the conference participant. Such a mechanism, that makes use of a participant profile, may also be used to provide other methods of connecting to a participant (such as via the Internet or company Intranet, using an internet protocol (IP) address as the current location of the conference participant) or back up connection mechanisms (i.e., connect using a secondary location telephone number or other address, if the first location telephone number is busy or otherwise unavailable).

Embodiments allow a subscriber to provision the present invention using various techniques including, but not limited to, inputting conference logistics in response to a dual tone multiple frequency (DTMF) menu, forwarding a formatted file comprising labeled conference provisioning information to the present invention, and inputting conference logistics into a form associated with a subscriber communication device, and wherein the communication device may include mobile telephones, portable telephones, personal digital assistants (PDAs), wireline telephones, and Internet based phones accessed using a personal computer (PC).

Embodiments of the present invention offer many advantages over conventional conferencing systems. First of all, since a conference is established automatically, a conference participant need not remember numbers and codes for accessing a conference. Additionally, these conferences may be provisioned to be automatically established at periodic intervals (i.e., the monthly budget meeting).

The requirements for prior scheduling, operator interaction, and attendee interaction imposed by conventional approaches are eliminated, thus providing the subscriber and conference attendees with a completely automated interface.

Additional objects, advantages, and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 4 is an illustration of an exemplary format for a conference record;

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. The present invention may be practiced without some or all of these specific details. In other instances, well known process operations have not been described in detail in order not to unnecessarily obscure the present invention.

Figure 1:
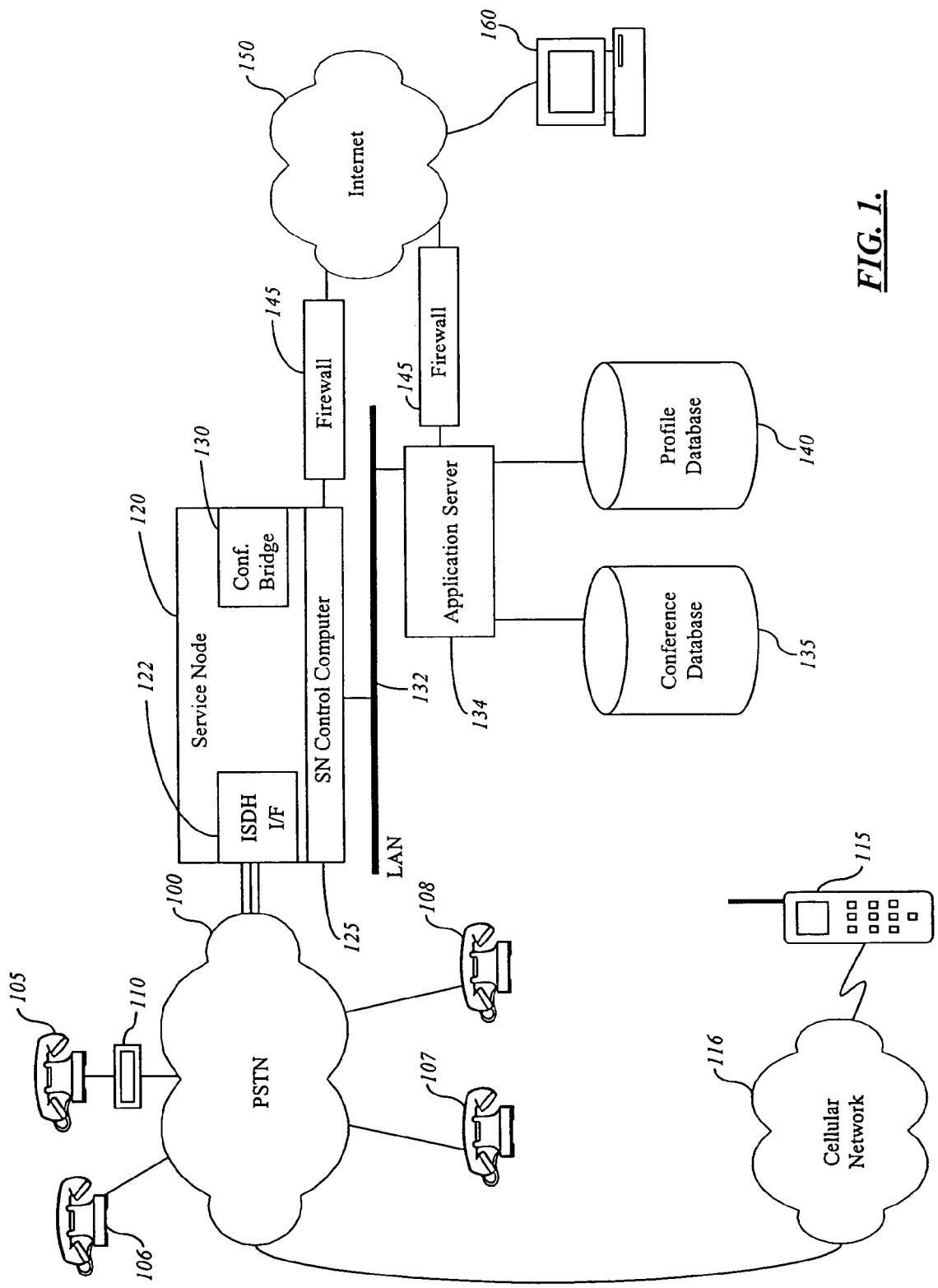
FIG. 1 is a functional block diagram illustrating an exemplary hardware environment for establishing an automatic conference call, according to an embodiment of the present invention.

Referring now to the drawings, in which like numerals indicate like elements throughout the several figures, FIG. 1 illustrates an exemplary hardware environment for establishing an automatic conference call, according to an embodiment of the present invention. In one embodiment, a conference call is automatically established using a call-log. The term "communication" is used herein to include all calls that may be exchanged between a caller and a called party in the system illustrated in FIG. 1. A subscribing party 105, who has subscribed to an automatic conference call service, is in communication with a first attendee 106, a second attendee 107, a third attendee 108, and a fourth attendee 125. The subscribing party 105, and attendees 106, 107, and 108, are communicating with each other using communication devices, such as landline telephones. Attendee 125 is also participating in the conference call using a mobile phone, which is connected to a cellular network 126. A device, such as a caller ID box 110, may be installed on the subscriber's line, such as that shown for subscriber 105, which is operable for inputting caller information into a call-log displayed on the subscriber's 105 communications device.

The system of FIG. 1 comprises a telephone network environment for making a conference call, including a Public Switched Telephone Network (PSTN) 100 and a cellular network 116. The PSTN 100 may be viewed as the aggregate of all lines and equipment serving to connect telephone users, but excludes private networks formed from leased telephone lines, wireless systems, and public data networks like the Internet.

As is shown, the subscriber party 105 and attendee parties 106, 107, 108, and 115, are connected to the PSTN 100. The subscribing party 105 initiates a conference call, which is created and administered automatically under the control of a conference service node 120, which is coupled to the telecommunications network. The conference service node 120 is capable of controlling and performing certain communications processing and switching functions.

Attendees 106, 107, 108, and 115 are selected by a subscribing party 105, and connected to a conference call automatically by the service node 120. In one embodiment, attendees 106, 107, 108, and 115 may be invited to join the conference. The attendees 106, 107, 108, and 115 are first called by the service node 120, which may play a recorded message when an attendee (106, 107, 108, or 115) answers the call from the service node 120. Each attendee (106, 107, 108, and 115) who answers such a call is presented with an option to accept or refuse a connection to the conference by responding with a DTMF (Dual Tone Multiple Frequency) "1" or "0", respectively, from the attendee's (106, 107, 108, or 115) touch tone telephone, in an embodiment.

In one embodiment, a conference call is automatically established when the subscribing party initiates the conference call using a call-log feature contained within their communication device. The service node 120 generates a reference identifier for each attendee, based on the subscribing parties call-log display. The service node 120 generates and maintains control over all of the personal references and manages the conference call. The personal call-log reference comprises a telephone number which is used to identify an attendee. In one embodiment, attendees 106, 107, 108, and 115 answer their communication device and connect to and join the conference call from the location in which their caller identification information was originally provided from.

In an embodiment, the service node 120 is in communication with a conference database 135. A service node 120 comprises an Integrated Services Digital Network (ISDN) interface 122, a conference bridge 130, and a service node (SN) control computer 125, while a conference database 135 comprises provisioned conference information (i.e., conference logistics). An ISDN interface 122 provides PRI (Primary Rate Interface) and BRI (Basic Rate Interface) interfaces for voice and data channels between the service node 120 and the PSTN 100. A conference bridge 130 comprises a switch for "bridging" or connecting conference participants. A SN control computer 125 is a computer which executes software for automatically setting up and connecting conference calls without requiring the participants to dial into a conference service. In the embodiment shown, the SN control computer 125 communicates with the conference database 135 via a local area network (LAN) 132 and an application server 134. Additionally, as shown, the SN control computer 125 may be accessed for provisioning and maintenance purposes, inter alia, via the Internet 100 and a firewall 145.

In a preferred embodiment, the service node 120 is in communication with a profile database 140. In the embodiment shown, the SN control computer 125 communicates with the profile database 140 via a LAN 132 and an application server 134. A profile database 140 stores provisioned participant profile data. Participant profile data comprises a participant identifier, a participant address, a current or preferred address of a conference participant, a home address, a wireless address, and a computer address. An address may be a telephone number, an Internet protocol (IP) address, or another address which identifies a device that may connect to a conference. In the embodiment described, an address comprises a telephone number.

Conference logistics and participant profile data may be provisioned or input by a subscriber into the conference database 135 using various techniques. These techniques include a menu-based dual tone multiple frequency (DTMF) entry system, in which a subscriber 105, dials into a provisioning system which guides the subscriber 105 through a menu of provisioning options. The subscriber 105 uses the subscriber's touch tone phone to respond to the menu. Provisioning software captures the subscriber's 105 responses and formulates these responses into a conference information record, which may then be stored in a conference database 135. Additionally, the service node 120 can provide a variety of voice, Automatic Speech recognition (ASR), FAX, Text to Speech-based provisioning services using off-the-shell voice circuit boards from vendors such as Dialogic and Antares Audio Technologies. Such provisioning techniques may be implemented via hardware within the service node 120 and/or via software executing on the SN control computer 125 in various embodiments.

Other provisioning techniques available to subscribers with Internet access include the use of a web-based form, a formatted file, and a formatted email message. When using a web-based form, a subscriber having a browser running on a computer 160 with an Internet 150 connection accesses a provisioning form by supplying a uniform resource locator (URL) for such a form. The subscriber may enter provisioning information (such as a conference name, conference participants' names, conference participants' phone numbers, and the date and time of the teleconference) into the form and send the form entries as a CGI string, in one embodiment, to a provisioning software interface.

Other subscriber-provisioning mechanisms include sending a formatted email or a formatted file from a subscriber computer 160 to the service node 120. An exemplary formatted email message may have a subject line of "CONFERENCE", and contain labeled lines within the body of the email. Such labeled lines may take the form of: "NUMBER=4045551234", "NUMBER=4045559876", "NUMBER=2025554567", "NUMBER=7035551357", "DATE=120101", and "TIME=090000". When a service node 120 receives an email with a CONFERENCE subject line and containing the above six labeled lines, a provisioning module 200 running on the service node 120 will extract the values to the right of the "=" for each labeled line. These extracted values may then be used to populate a conference information record 400, which is then stored in a data store 210 and/or conference database 135. The conference information record 400 will subsequently be used by a conference establishment subsystem to establish a teleconference session at the provisioned start date (Dec. 1, 2001) and start time (09:00:00), and among conference participants having telephone numbers (404) 555-1234, (404) 555-9876, (202) 555-4567, and (703) 555-1357.

A similar mechanism may be employed using formatted files. Such files may also contain labeled lines, and are electronically transferred via file transfer protocol (FTP) or another file transfer utility.

Provisioning techniques employing web-based forms, formatted files, and formatted email messages may be implemented on an application server 134. A conference call initiator or subscriber using the Internet 150 may forward provisioning information to the application server 134 through a firewall 145, in an embodiment.

Additionally, such mechanisms may be readily adapted for provisioning participant profile data. For instance, a subject line of "PROFILE" may indicate that the email is to be processed by a provisioning module 200 as containing labeled lines indicating a participant identifier or telephone number ("PARTICIPANT="), a current or preferred address or usual telephone number ("CURRENT="), office number ("OFFICE="), home number ("HOME="), cellular or wireless number ("CELL="), and/or Internet address ("IP="). In the case of participant profile data, however, the provisioning module 200 would construct a profile record, and forward the profile record to a profile database 140 for permanent storage.

Similar provisioning techniques, as those previously discussed, may also be used for client devices, including cellular phones 115 and other thin client devices. However, access to the service node 120 is available through the PSTN 100 by way of a cellular network 116, in the case of provisioning via a cell phone 115.

Provisioning software is a component of an interface subsystem for an embodiment of the present invention, and provides provisioning (or subscriber-inputting) capabilities for conference provisioning information (or conference logistics) and participant profile data. This provisioning software is also responsible for formulating conference records, which are stored in a data store 210 and a conference database 135, and profile records, which are stored in a profile database 140, from conference provisioning information and participant profile data, respectively. As previously discussed, provisioning software may execute on a SN control computer 125 and/or an application server 134 in other embodiments. The software components of an embodiment of the present invention are further presented in the discussion of FIG. 2.

Figure 2:
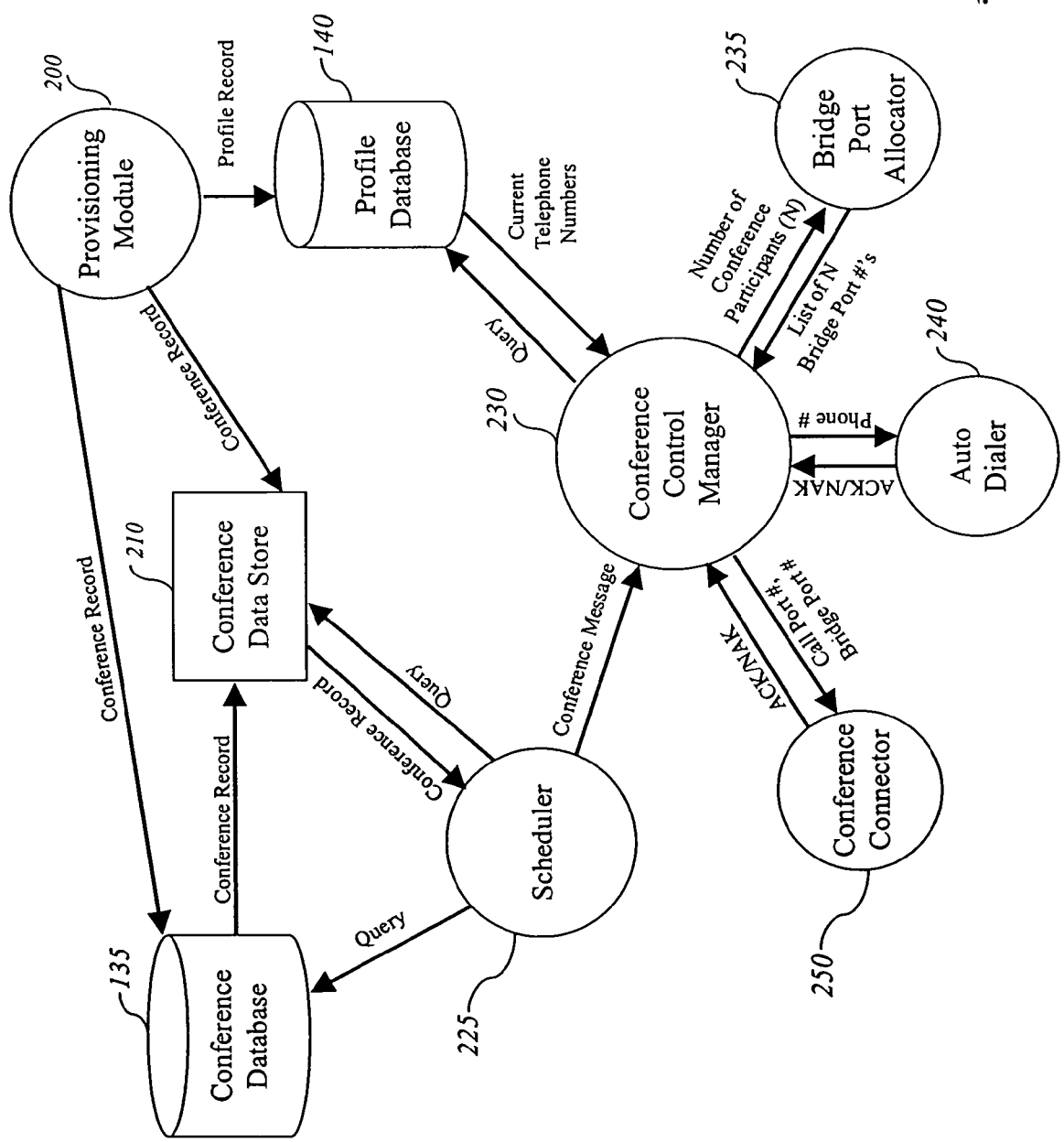
FIG. 2 is a functional block diagram illustrating an exemplary message flow among software modules, and between software modules and data repositories in an embodiment of the present invention.

FIG. 2 comprises software modules and database interfaces for an embodiment of the present invention. Conceptually, the embodiment illustrated in FIG. 2 describes two software subsystems: a subscriber or provisioning interface subsystem; and, a conference establishment subsystem. The subscriber interface subsystem is responsible for receiving subscriber provisioning inputs, formulating conference and profile records, and storing such records, whereas the conference establishment subsystem automatically establishes a conference among the conference participants based upon the information contained in those stored records. Functions implemented by the conference establishment subsystem include conference set up (or bridge port allocation) and conference participant connection. A system configurable time interval (i.e., a delay) may occur between the performance of these functions in an embodiment of the present invention.

There are six main software components shown in the exemplary embodiment of FIG. 2. In an exemplary embodiment, these software components execute on the SN control computer 225 and include a provisioning module 200, a scheduler 225, a conference control manager (CCM) 230, a bridge port allocator 235, an auto-dialer 240, and a conference connector 250.

A subscriber to an automatic conferencing service interacts with a provisioning module 200 to create conference records comprised of data that instructs the present invention as to how and when automatic conference call connections are to be made. Conference records may be stored in a conference database 135 or a conference data store 210 or both. A data store 210 may be implemented as shared memory (or a shared file or directory) resident on the service node 120, or as a service node peripheral device. The provisioning module 200 stores conference records of future conferences in the conference database 135. Such conference records will be extracted from the conference database 135 by a scheduler 225, which will be discussed later. The provisioning module 200 stores conference records of conferences that are to be started immediately (or within twenty-four hours) in the conference data store 210.

A subscriber may also interact with the provisioning module 200 to create profile records, which are stored in a profile database 140. Profile records are comprised of called party (i.e., a participant who is automatically called in order to establish a conference) information such as a called party identifier, a work telephone number, a home telephone number, a cellular telephone number, and a current telephone number. An embodiment of the present invention will automatically connect to the current telephone number found in a profile record for a called party, thereby overriding that participant's telephone number which was provided in a conference record. If a profile record for the called party does not exist in the profile database 140, then the conference record information is used to connect the called party to the conference.

Another software component of an embodiment of the present invention is known as a scheduler 225. A scheduler 225 determines when a conference should be set up and connected. The scheduler 225 maintains conference containers (queues, lists, etc.) that contain conference records. The container in which a record is stored is indicative of how the record will be processed. For instance, in an exemplary embodiment, an immediate conference queue contains conference records of teleconferences that are to be established immediately. Records of conferences that are merely to be set up (i.e., only the bridge ports are to be allocated) are maintained in a set up conference list. Records of conferences that are to be connected (i.e., the bridge ports have been previously allocated, but the conference participants have yet to be connected) are maintained in a connect conference list.

The scheduler 225 creates a conference message for each conference record stored in a conference container at the time of a record is processed. Three types of conference messages are created. Type one indicates that a conference is to be immediately established (i.e., with no delay between set up and connection). Type two indicates that a conference is to be set up (i.e., only allocate conference bridge ports). Type three indicates that a previously set up conference is to be connected (i.e., connect all conference participants) to the conference session.

In an exemplary embodiment, a scheduler 225 receives an interrupt signaling that a conference record has been added to the data store 210. The scheduler 225 then reads the conference record from the data store 210 and places the record within one of two conference containers. The first conference container comprises conference records for conferences that are to be started immediately. The second conference container comprises conference records for conferences that are to be set up in advance, then connected at a later time. Note that a third container is subsequently created and maintained by the scheduler 225. This third container comprises processed conference records from the second container and represents conferences that have been set up, but not yet connected. The first container is implemented as a queue, and the second and third containers are implemented as linked lists, in the exemplary embodiment.

The scheduler 225 processes a record and creates a conference message based upon the subscriber-provisioned set up and start times of a conference, as reflected in a conference record. After a conference message is created, the scheduler 225 forwards the message to a conference control manager (CCM) 230.

The CCM 230 operates as a hub for the software components implemented in an embodiment of the present invention. After receiving a conference message from the scheduler 225, the CCM 230 interacts with the appropriate components to set up and connect the conference.

In order to set up a conference (i.e., allocate bridge ports), the CCM 230 extracts the number of conference participants (N) from a (type 1 or type 2) conference message received from the scheduler 225. The CCM 230 forwards the value of N to a bridge port allocator 235. The bridge port allocator 235 comprises software to interface with a teleconference bridge and to allocate N bridge ports. The bridge port allocator 235 returns a list of N allocated bridge port numbers to the CCM 230. At this point a conference has been "set up."

A CCM 230 also directs the process of connecting teleconference participants. The CCM 230 extracts the telephone numbers of all conference participants contained in a (type 1 or type 3) conference message. The CCM 230 updates the extracted telephone numbers with a current telephone number for the participant (which is obtained from a profile database 140), if such a current telephone number exists in the profile database 140. If no entry for the participant exists in the profile database 140, then the participant's telephone number, as it appears in the conference record is used to connect the participant to the conference.

The CCM 230 then instructs an auto dialer 240 component to dial (i.e., call) each participant's telephone number. The auto dialer 240 returns a switch port (or call port) number for each conference participant successfully called. The CCM 230 then forwards a message to a conference connector 250. This forwarded message comprises a switch port number (received by the CCM 230 from the auto dialer 240) and an allocated bridge port number (received by the CCM 230 from the bridge port allocator 235) for each conference participant. The conference connector 250 then connects the switch port to the allocated bridge port for each participant, thereby connecting each participant to the teleconference.

The software components shown in FIG. 2 implement the two major subsystems of an embodiment of the present invention. The provisioning module 200 implements a provisioning subsystem. The scheduler 225, the CCM 230, the bridge port allocator 235, the auto dialer 240, and the conference connector 250 interoperate to implement a conference establishment subsystem. The provisioning and conference establishment subsystems are shown in FIG. 3.

Figure 3:
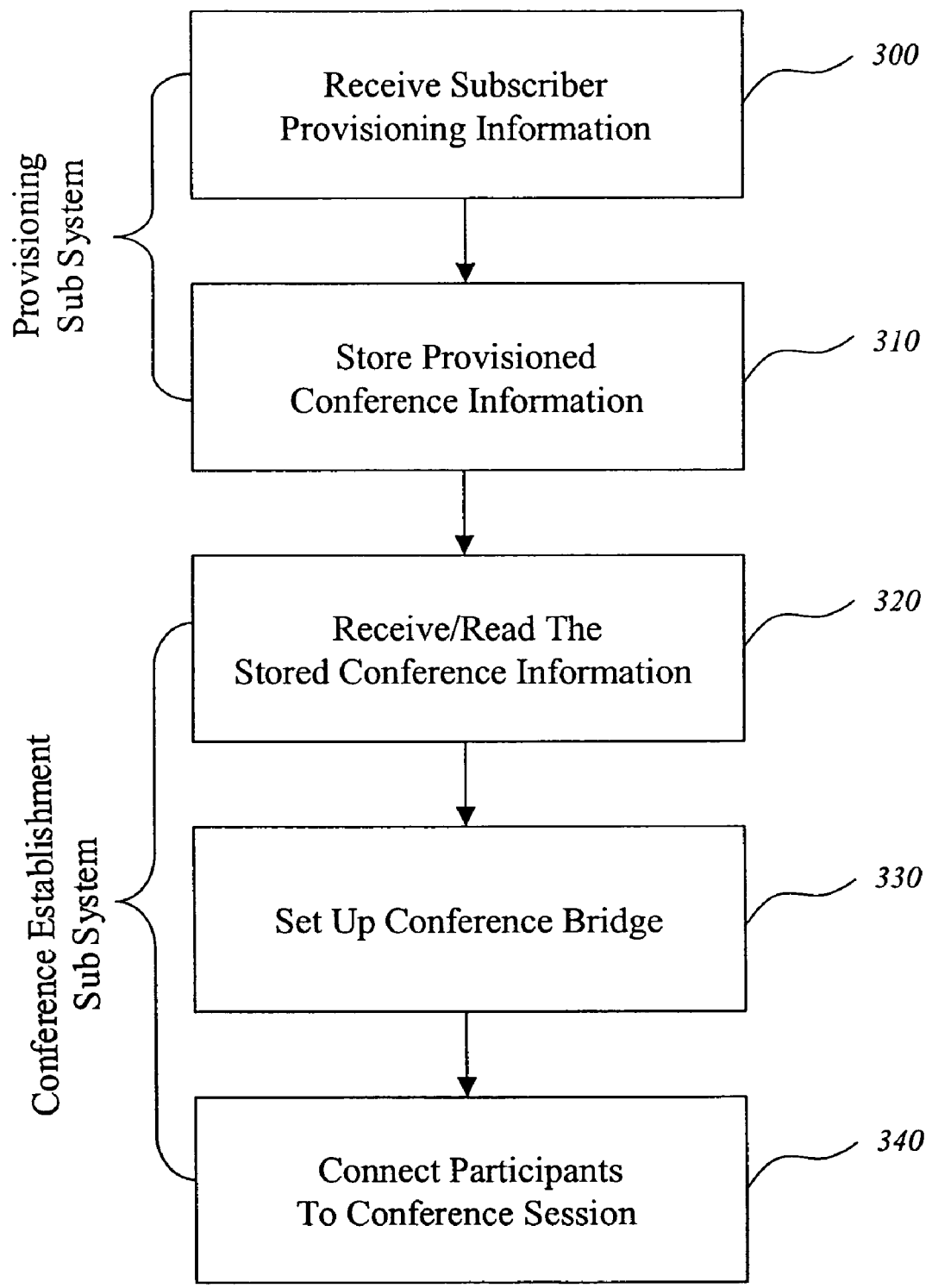
FIG. 3 is a flow chart illustrating an overall process for implementing an embodiment of the present invention.

A flow chart of an embodiment of an overall conference call set up automation process is shown in FIG. 3. The steps enumerated in the flow chart of FIG. 3 are executed on a SN control computer 125 by the software components described in FIG. 2. In another embodiment, these steps may be executed on more than one hardware platform. For example, in the flow chart shown in FIG. 3, a provisioning subsystem is implemented by steps 300 and 310, and may be carried out on one hardware device, whereas a conference establishment subsystem that is implemented by steps 320, 330 and 340 may be executed on another hardware device in communication with the first hardware device.

Referring to FIG. 3, an exemplary conference call set up automation process provided by an embodiment of the present invention begins with a provisioning module 200 receiving conference subscriber provisioning information 300. A subscriber provisions an embodiment of the present invention as previously described in the discussion of FIG. 1. Conference provisioning information (or conference logistics) may include a start date and time, the number of conference participants, and a telephone number for each participant. Additionally, participant profile provisioning data may comprise a participant's name or other identifier, usual telephone number, current telephone number, office telephone number, home telephone number, and a cellular telephone number.

Next, the provisioned conference information is stored by the provisioning module 200 in step 310. As discussed previously, conference information (in the form of a conference record, in one embodiment) is stored in a conference database 135 and/or a data store 210. Once conference logistics or conference provisioning information has been provided by a subscriber, a conference may be automatically established without subsequent user intervention. Participant profile data may be stored as profile records in a profile database 140, in one embodiment.

The stored conference information (in the form of a conference record) is then read by the scheduler 225 in step 320. After receiving a type 1 or type 2 conference message, the CCM 230, via the bridge port allocator 235, sets up a teleconference bridge in step 330. Finally in step 340, after receiving a type 1 or type 3 conference message the CCM 230, operating in conjunction with the auto dialer 240 and the conference connector 245, connects the conference participants to a conference session in step 340.

Figure 5:
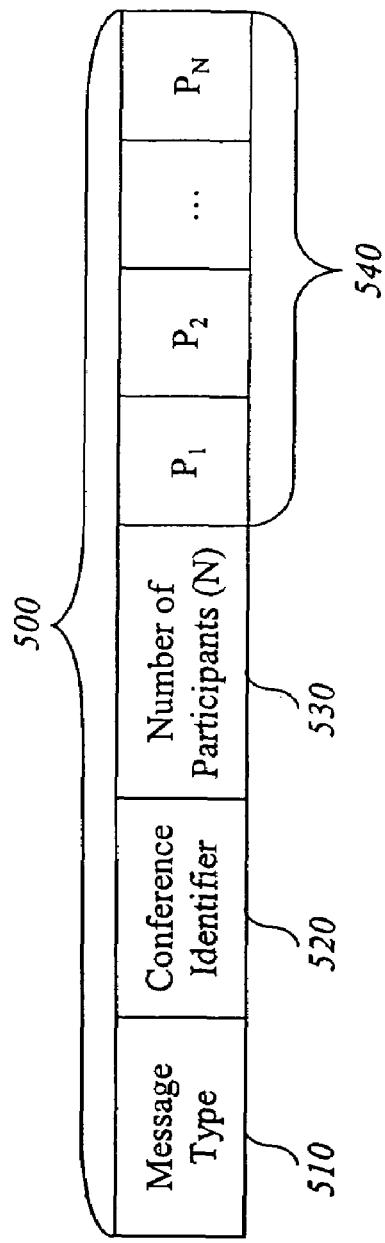
FIG. 5 is an illustration of an exemplary format for a conference message that is forwarded from a scheduler to a conference control manager.

A conference record provides a mechanism in which the provisioning module 200 communicates with the scheduler 225 in the exemplary embodiment. A conference message provides a mechanism in which the scheduler 225 communicates with the CCM 230. An exemplary conference record is shown in FIG. 4, and an exemplary conference message is shown in FIG. 5.

FIG. 4 illustrates an exemplary conference record 400. A conference record 400 is created by a provisioning module 200 when a conference subscriber inputs conference provisioning information. Conference provisioning information may include such parameters as a conference name, a conference start date and time, the number of conference participants, and contact information (such as a telephone number) for each conference participant.

Field 405 of conference record 400 comprises a conference name. A conference name is a subscriber-provided alphanumeric value, and may be used by a subscriber to recall a stored conference record from a conference database 135 for editing or to invoke an automated conference session immediately or at a future date and time.

Field 410 comprises a conference identifier. This field is a unique value that is provided by a provisioning module 200 in one embodiment. The present invention uses this value for accounting purposes to correlate allocated bridge ports with conferences that are set up but not yet connected, for example.

A start date (field 420) and start time (field 440) are subscriber-provided fields that reflect the day and time the subscriber desires to hold the teleconference. A set up time field (field 430) is comprised of a time in advance of the start time of field 440 in which bridge ports are allocated for the conference identified by the conference identifier of field 410. In alternative embodiments, the set up time may be subscriber-provided or may be calculated by the provisioning module 200. Calculation of the set up time may take place by the provisioning module 200 receiving or reading a system administrator-supplied global configuration parameter and offsetting the start time of field 440 with that configuration parameter. For example, a configuration parameter of "2" may indicate that all conferences should be set up two hours in advance. In such a case, a start time field 440 containing a value of 8:00:00 would result in a set up time field 430 value of 6:00:00.

A "number of participants (N)" field 450 contains an integer value representing the number of conference participants. In alternative embodiments, this value may be subscriber-supplied during a provisioning process or derived by the provisioning module 200 from the number of telephone numbers provisioned by a subscriber. Field 460 is comprised of a series of subfields ($P_1$ through $P_N$), in which each subfield contains a telephone number of a conference participant.

Conference records 400 may be stored locally (i.e., local to a service node 130) within a conference data store 210, and also in secondary storage, such as a conference database 135. The fields of a conference record 400 are used to create conference messages that are subsequently sent from a scheduler 225 to a CCM 230. These messages instruct the CCM 230 as to the level of teleconference establishment that is necessary at the time the conference message is received by the CCM 230. In an exemplary embodiment, the three types of conference messages employed are of a format as illustrated in FIG. 5.

FIG. 5 illustrates an example format for a conference message 500, which is forwarded from the scheduler 225 to the CCM 230 in the exemplary embodiment of the present invention. A conference message 500 comprises fields for a message type, a conference identifier, the number of participants (N), and the telephone numbers of each conference participant ($P_1$ through $P_N$).

Field 510 contains a message type value. In an example embodiment, a message type may have a value of 1, 2 or 3. A conference message type of 1 indicates to the CCM 230 that the conference (identified by the value found in field 520) should be established immediately. A conference message of type 2 indicates to the CCM 230 that the conference (identified by the value found in field 520) should be merely set up. In such a case, conference bridge ports would be allocated for the conference identified by the value found in field 520, but the conference participants would not be connected (i.e., teleconferenced) until a later time. Note that this later time is the time reflected in the start time field 440 of a conference record 400 for that particular conference.

Continuing with the discussion of field 510, a message type value of 3 indicates to the CCM 230 that the conference (identified by the value found in field 520) should be connected. One type 3 conference message will be subsequently processed for each type 2 message processed by the CCM 230. Thus, when a message type 3 is received by the CCM 230, the conference participants are connected to a conference session via the previously allocated conference bridge ports, which were allocated as a result of the processing of a prior type 2 message.

Figure 7:
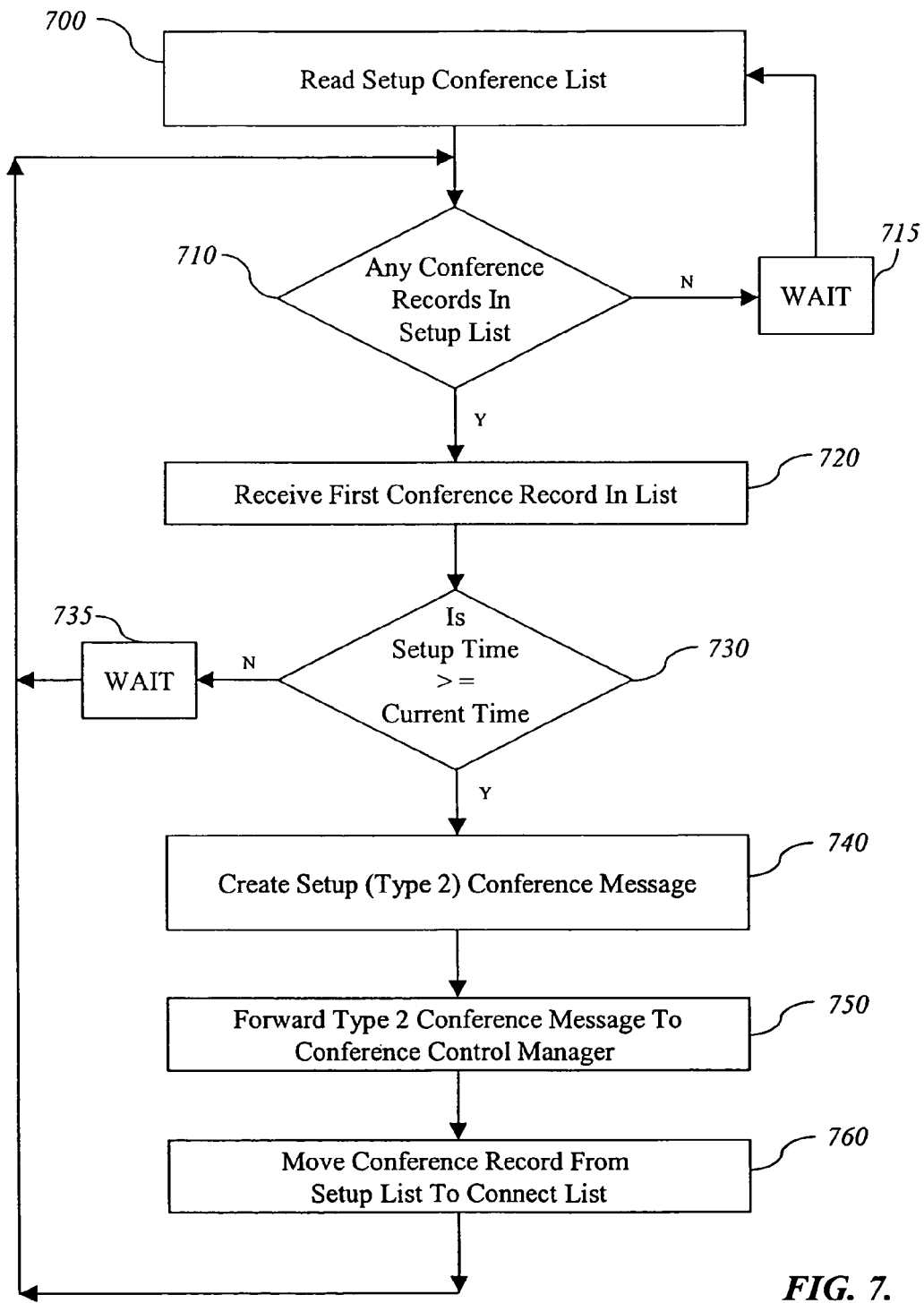
FIG. 7 is a flow chart illustrating an exemplary process by which a scheduler may maintain a set-up list and generate a set-up conference message for each conference record contained within the list.
Figure 8:
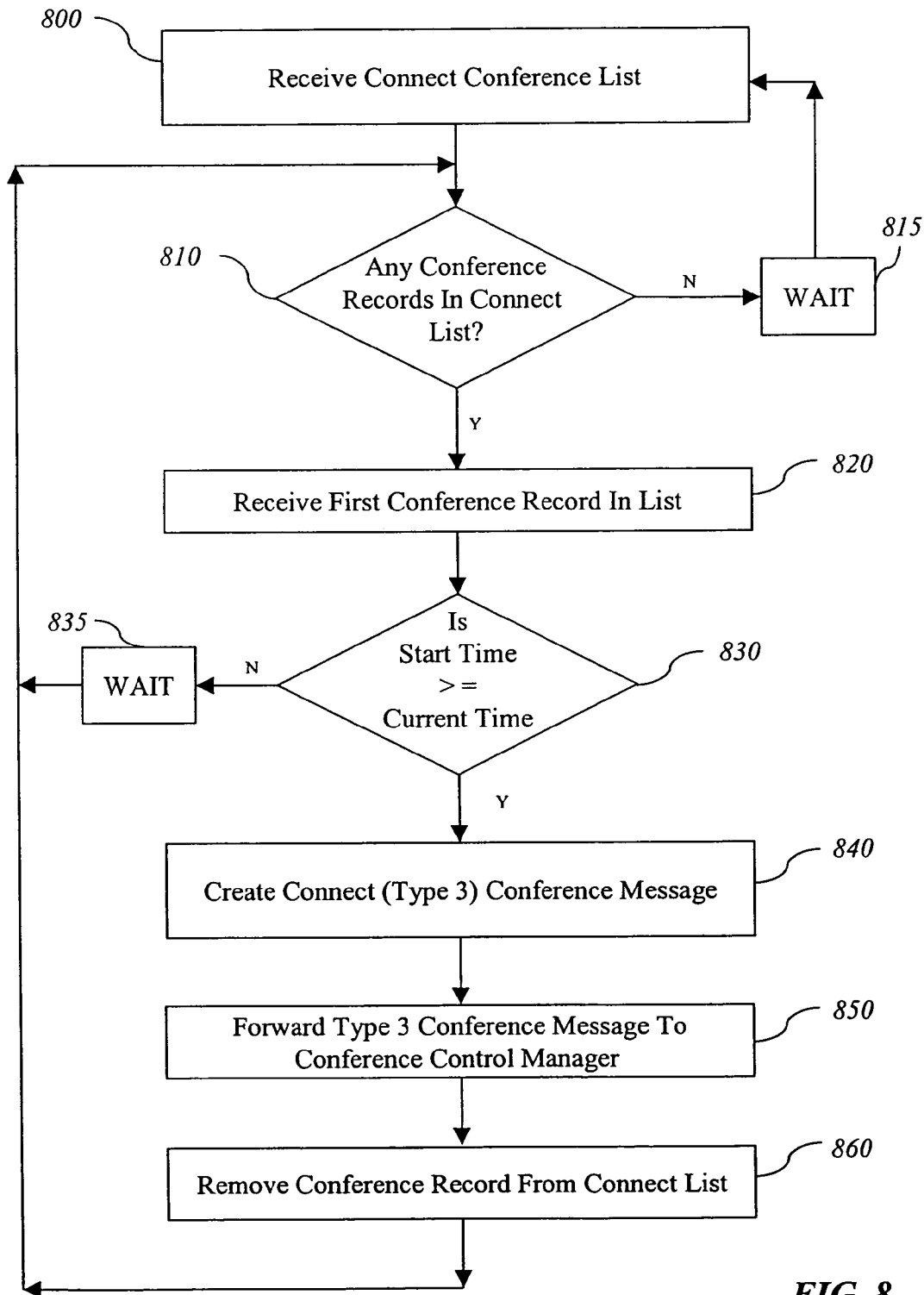
FIG. 8 is a flow chart illustrating a process by which a scheduler may maintain a connect list and generate a connect conference message for each conference record contained within the list.

As previously discussed with FIG. 2, each conference record 400 in an exemplary embodiment is placed into one of three conference containers, which are maintained by the scheduler 225. Each conference record 400 is converted into a conference message 500 by the scheduler 225 and forwarded to the CCM 230 for appropriate action, based upon the message type field 510 of the conference message 500. The scheduler 225 processes for converting a conference record 400 into a conference message 500 of type 1, 2 or 3 are illustrated in FIG. 6, FIG. 7, and FIG. 8, respectively.

Figure 6:
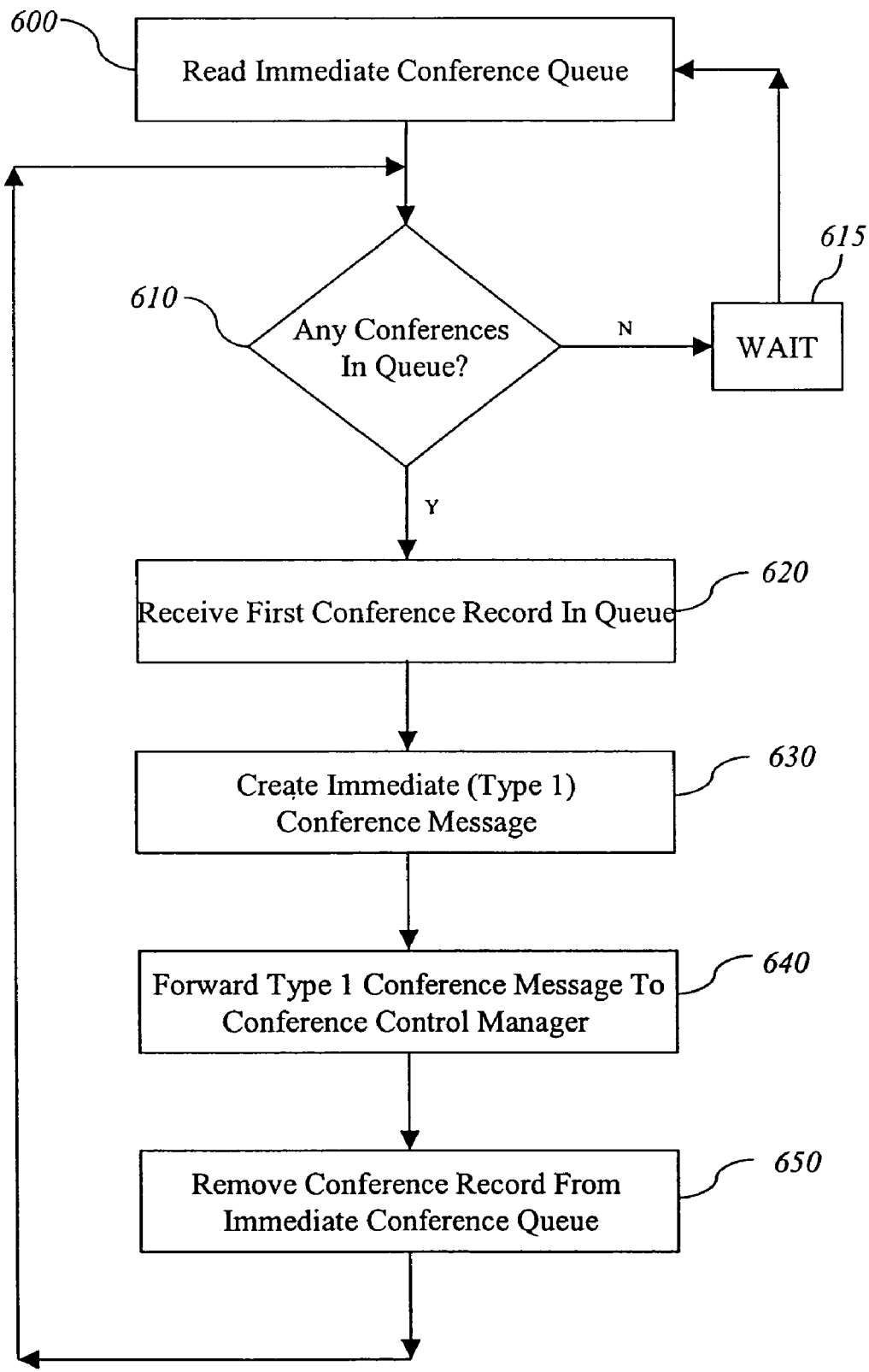
FIG. 6 is a flow chart illustrating an exemplary process by which a scheduler may maintain an immediate conference queue and generate an immediate conference message for each conference record contained within the queue.

FIG. 6 illustrates a flow chart of an exemplary method executed by a scheduler 225 for processing immediate conference requests. Such requests indicate subscribers' intentions to have teleconferences set up and the participants of each teleconference connected to the teleconference immediately after the bridge ports are allocated (e.g., immediately after a conference is set up).

In step 600, the scheduler 225 receives or reads an immediate conference queue (or other such data structure). The immediate conference queue is a container that holds immediate conference records 400. Immediate conference records represent subscriber requests to immediately establish a teleconference.

At step 610, the scheduler 225 begins a process for looping over all conferences in an immediate conference queue by determining if there are any conference records 400 in the immediate conference queue. If there are no immediate conference records 400 in the immediate conference queue, the scheduler 225 method for handling immediate conference requests goes into a wait state at step 615. The wait duration may be set by a system administrator as a configuration parameter. Alternatively, the wait duration may end when an interrupt occurs signaling the arrival of an immediate conference record 400 in the immediate conference queue. When the wait duration terminates, the scheduler 225 resumes executing at step 600.

If there are immediate conference records 400 in the immediate conference queue, as determined in step 610, then in step 620 the scheduler 225 receives or reads the first conference record 400 in the queue. The scheduler 225 creates an immediate (or type 3) conference message 500 in step 630 from the received conference record 400.

The immediate (or type 1) conference message 500 is then forwarded in step 640 by the scheduler 225 to a CCM 230, and the conference record 400 is removed from the immediate conference queue in step 650 by the scheduler 225. Processing of the immediate conference queue then loops back to step 610. The establishment of an immediate teleconference from the perspective of a CCM 230 process is further explained in the discussion of FIG. 9.

FIG. 7 illustrates a flow chart of an exemplary method executed by a scheduler 225 for processing set up conference requests. Such requests indicate subscribers' intentions to have teleconferences set up (e.g., the conference bridge ports allocated) at a set up time as specified in field 430 of a conference record 400, and have each conference's participants connected to the teleconference at a later time, as specified in field 440 of a conference record.

In step 700, the scheduler 225 receives or reads a set up conference list (or other such data structure). The set up conference list is a container that stores conference records 400 that have yet to be set up. That is, the set up time field 430 of a conference record 400 contains a valid value, and that set up time has not yet occurred.

At step 710, the scheduler 225 begins to loop over all conferences in the set up conference list by determining if there are any conference records 400 in the set up conference list. If there are no such records 400, the scheduler 225 method for handling set up conference requests goes into a wait state at step 715. The wait duration is set by a system administrator as a configuration parameter. When the wait duration lapses, the scheduler 225 begins executing at step 700 again.

If there are set up conference records 400 in the set up conference list, then in step 720 the scheduler 225 receives or reads the first conference record 400 in the list. The scheduler 225 next determines if the time has arrived to set up the conference in step 730 by comparing the set up time (as reflected in field 430 of a conference record 400) to the current time in step 720. The current time may determined by a system call to the Service Node's 130 operating system.

If the set up time is earlier than the current time, then a wait state is entered into at step 735. In an embodiment, a set up list is maintained as a linked list in which an earlier position in the list is occupied by a conference record 400 having an earlier set up time, as reflected in field 430 of a conference record 400. In other words, conferences appearing in a set up list may be arranged in ascending chronological order, based upon the conference set up time of field 430 of the conference record 400. When the wait duration of step 735 lapses, the scheduler 225 begins executing at step 710 again. The wait duration of step 735 may be based upon a different configuration parameter than the wait duration of step 715.

If the set up time equals (or is greater than) the current system time, then the scheduler 225 creates a set up (or type 2) conference message 500 in step 740. The set up (or type 2) conference message 500 is then forwarded in step 750 by the scheduler 225 to a CCM 230, and the conference record 400 is removed from the set up conference list and inserted into a connect conference list (in ascending chronological order, based upon the value of the conference start time as reflected in field 440 of the conference record 400) by the scheduler 225 in step 760. Processing of the set up conference list then loops back to step 710. The set up of a conference is further explained from the perspective of a CCM 230 in the discussion of FIG. 9.

FIG. 8 illustrates a flow chart of an exemplary method executed by a scheduler 225 for processing connect conference requests. Such requests indicate that the time has arrived to connect participants to a teleconference that has been set up (i.e., the conference bridge switch ports have been previously allocated).

In step 800, the scheduler 225 receives or reads a connect conference list (or other data structure). The connect conference list is a container that holds conference records 400 for conferences that have been set up, but not yet connected. That is, the set up time as reflected in a set up time field 430 of a conference record 400 has arrived, but the start time of a start time field has not yet been reached.

At step 810, the scheduler 225 begins to loop over all conferences in the connect conference list by determining if there are any conference records 400 in the connect conference list. If there are no such records 400, the scheduler 225 method for handling connect conference requests goes into a wait state at step 815. The wait duration is set by a system administrator as a configuration parameter. When the wait duration lapses, the scheduler 225 begins executing at step 800 again.

If there are connect conference records 400 in the connect conference list, then in step 820 the scheduler 225 receives or reads the first conference record 400 in the list. The scheduler 225 next determines if it is time to connect the conference in step 830 by comparing the start time (as reflected in field 440 of a conference record 400) of the conference record 400 received in step 820 to the current system time. The current time may be determined by a system call to the Service Node's 130 operating system.

If the start time is later than the current time, then a wait state is entered into at step 835. In an embodiment, a connect list is maintained as a linked list in which an earlier position in the list is occupied by a conference record 400 having an earlier start time, as reflected in field 440 of a conference record 400. In other words, conferences appearing in a connect list may be arranged in ascending chronological order, based upon the conference start time of field 440 of the conference record 400. When the wait duration of step 835 lapses, the scheduler 225 begins executing at step 810 again. The wait duration of step 835 may be based upon a different configuration parameter than the wait duration of step 815.

If the start time of the conference equals (or is greater than) the current time, then the scheduler 225 creates a connect (or type 3) conference message 500 in step 840. The connect (or type 3) conference message 500 is then forwarded in step 850 by the scheduler 225 to the CCM 230, and the conference record 400 is removed from the connect conference list in step 860 by the scheduler 225. Processing of the connect conference list then loops back to step 810. The connecting of participants to a conference session is further explained from the perspective of a CCM 230 in the discussion of FIG. 9.

Figure 9:
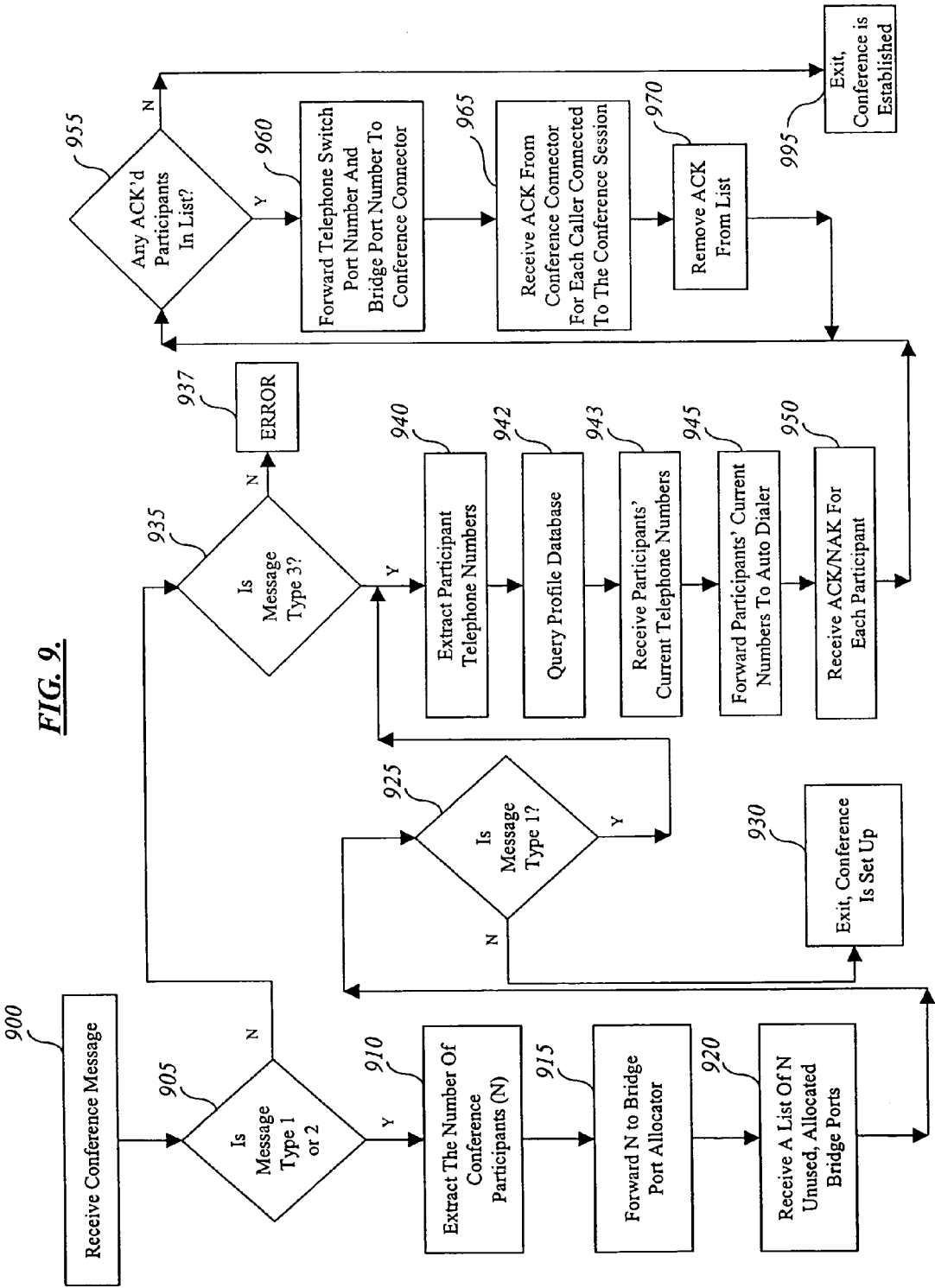
FIG. 9 is a flow chart illustrating a process by which a conference control manager directs the establishment of a conference session.

FIG. 9 illustrates steps taken by an embodiment of the present invention to automatically set up and/or establish a teleconference session. The Conference Control Manager (CCM) 230 of FIG. 2 executes these steps in an exemplary embodiment.

In step 900 of FIG. 9, a CCM 230 receives a conference message 500. Next, the CCM 230 determines whether the message received is of either type 1 or type 2 in step 905 by extracting the message type field 510 of the received conference message 500 and performing a simple comparison. If the conference message type value is not 1 or 2, then in step 935, the CCM 230 determines whether the message type value is 3. If the conference message is not of type 3, then an error condition has occurred and an error routine is executed by the CCM in step 937. Such a routine may merely log the error event, and discard the erroneous conference message 500, in one embodiment. If the conference message type value is 3, then processing continues at step 940, which is discussed later.

Continuing with the discussion of step 905, if the conference message 500 is either of type 1 or 2, then in step 910 the CCM 230 extracts the value from the Number of Participants (N) field 530 of the received conference message 500. The CCM 230 then forwards N (i.e., the number of conference participants) to a bridge port allocator 235 in step 915. The CCM 230 subsequently receives a list (or array) of N unused bridge ports that have been allocated by the conference bridge switch for this particular conference in step 920. Note that this conference session is uniquely identified by the value of the Conference Identifier field 520 of the received conference message 500. In an embodiment, the CCM 230 maintains a bridge port allocation list comprising conference identifiers (from field 520 of a conference message 500) and the allocated bridge port numbers (received from the bridge port allocator 235 in step 920) associated with each conference identifier.

At this point in the processing of a conference message 500 (i.e., at step 925), the CCM 230 distinguishes between type 1 and type 2 messages 500 by determining if the received conference message 500 is a type 1 message 500. If the conference message 500 is not a type 1 conference message 500, then it is of type 2 and processing exits at step 930. Upon exiting at step 930, a conference has been set up. In other words, conference bridge ports have been allocated for the conference identified by a conference identifier field 520 of the received conference message 500. These allocated bridge ports are correlated with this particular conference via a bridge port allocation list maintained by the CCM 230, as previously discussed.

Continuing with step 925, if the received conference message 500 is of type 1, then that conference message 500 is an immediate conference message. Processing continues at step 940.

When step 940 is reached, a conference has been set up but not yet connected. In other words, conference bridge ports have been allocated for the conference associated with the conference identifier value field 530 of the conference message 500. Processing of a type 1 or immediate conference message 500 arrives at step 940 via step 925. Processing of a type 3 or connect conference message 500 arrives at step 940 via step 935.

In step 940, the CCM 230 extracts a telephone number for each participant from subfields $P_1$ through $P_N$ of field 540 within the conference message 500. The extracted telephone numbers are used to query a profile database 140 in step 942. Each extracted participant telephone number may be used as a search key to locate a participant profile in the profile database 140. If a match for the search key is found (i.e., a profile record is found which contains a participant identifier or usual telephone number field that equals the participant telephone number), then a current telephone number is extracted from the matching profile record by the profile database 140 and returned within an acknowledgement message (ACK) to the CCM 230. If no such match is found, a NAK (negative acknowledge message) comprising the participant's telephone number from the conference message 500 (which was used as the search key) is returned to the CCM 230, in one embodiment. In such a case, the participant's telephone (as it appears in the conference message 500) will be used to connect the participant to the conference.

In step 943, the CCM 230 receives the query response from the profile database 140. This response comprises each conference participant's current telephone number within either an ACK or a NAK response message, as explained above. The current telephone numbers for each participant are then forwarded by the CCM 230 to an auto dialer 240 in step 945.

The auto dialer 240 proceeds to dial the current telephone number for each conference participant. In one embodiment, when the participant's telephone goes off-hook (i.e., the participant answers the telephone), the auto dialer 240 plays a message such as "A conference call is being established. Would you like to be connected? Please respond 1 for YES or 2 for NO." If a called party (i.e., a potential participant) responds in the negative, the auto dialer disconnects the called party and returns a NAK, comprising the disconnected party's telephone number. A NAK that is received in step 950 alerts the CCM 230 that a bridge port for this conference may be deallocated. The CCM 230 maintains a list of all conferences that have been set up. This list correlates a conference identifier (extracted by the CCM 230 from a conference identifier field 520 of a conference message 500) to the bridge port numbers of ports allocated by the bridge port allocator 235. If any entities listed as conference participants do not join the conference session, then the CCM 230 will inform the bridge port allocator 235 of the number of ports that may be released back to the unallocated pool of conference bridge ports.

Returning to step 945, if a called party answers affirmatively, then the called party will be connected to the conference as a conference participant. This process begins with the auto dialer 240 returning an ACK, comprising a telephone switch port number of the called party who responded affirmatively. An ACK is received by the CCM 235 in step 950. The CCM 230 stores a list of received acknowledgements, and proceeds to connect each participant represented by a telephone switch port number in the acknowledgement list.

In another embodiment, at step 945 the auto dialer 240 dials a participant telephone number, and forwards an ACK immediately when the called party's (i.e., the participant's) telephone goes off-hook. A NAK is only returned if the participant's telephone does not go off-hook after a time period set by a system administrator. Again, an ACK/NAK for each participant is received by the CCM 230 in step 950.

In an alternative embodiment, an auto dialer 240 connects to each participant's address via a communications switch. The returned ACK message will then contain a communications switch port number associated with the participant's current address.

In step 955 the CCM 230 determines whether there are any acknowledged participants in the acknowledgement list. If so, then in step 960 the CCM 230 forwards the participant's telephone switch port number and an unused bridge port number (that was allocated for the conference) to a conference connector 250. If the participant is connected by the conference connector 250, then the conference connector 250 returns an ACK, which is received by the CCM 230 in step 965. In step 970, the CCM 230 removes the acknowledged participant from the acknowledgement list.

Processing loops back to step 955 and will continue with steps 960, 965 and 970, until there are no further acknowledged participants in the acknowledgement list. When there are no further participants to connect to the conference session, as determined by the CCM 230 in step 955, processing exits at step 995. At this point, the conference is established (i.e., the conference is set up and the participants are connected to the conference session).

As stated above, an AIN service node 130 retrieves selected invitee directory numbers from the subscriber's call-log through the provisioning module 200, places calls to those invitees automatically, and connects those invitees to the already established conference bridge. The service node 130 is programmed to receive the selected invitee numbers selected by the subscriber, and to establish connections to the invitees. The service node 130 provides the communication with the subscriber and all selected invitees by ringing the invitees using the displayed call-log directory numbers. If the invitee's directory number is a wireless number, the service node 130 routes the call to a wireless network so as to reach the wireless unit in a manner well known to those skilled in the art. After the service node 130 makes the calls to all numbers involved, the service node 130 then bridges or connects these calls to the already established bridge, so as to set-up a conference call.

Each piece of terminating equipment in the AIN is assigned a directory number. In the description of the present invention, the term "directory number" is used in its generally understood meaning to be the number which is dialed or input by a caller or source and used by the network to route the communication so as to reach a piece of terminating equipment associated with the dialed directory number. A directory number is commonly referred to as the telephone number. It should be noted that a piece of terminating equipment's directory number is not necessarily unique, but may be shared by a group of pieces of terminating equipment, such as telephone extensions.

As stated above, in FIG. 1, the preferred environment of the present invention includes a telecommunications system that includes a PSTN 100, and may in some cases include a wireless network 126. The terminating equipment in a wireless network is "wireless" in the sense that the equipment is not connected by any lines or wires to network elements. The terminating equipment in a wireless network receives communications through radio signals rather than through wires or optics. A cellular telephone network is an example of a wireless network. Thus, a conference call participant's communication means may include a cellular telephone, a mobile telephone, a mobile station, a portable telephone, and other devices that receive communications through radio signals.

As is well known to those skilled in the art, the PSTN 100 is connected to the wireless network 126 through an access tandem. The connection of the PSTN 100 to the wireless network 126 through an access tandem (or similar network element) allows for the interconnection of these two communication systems. Such interconnection is necessary so that a call from a wireline unit such as telephone may be connected to a wireless unit such as mobile telephone. The wireless network includes a geographic radio service area divided into cells, with each cell being generally serviced by a broadcast antenna which permits communications between a wireless unit operating within the area of the cell and a cell control. The cell control, in turn, is connected to a wireless network switch, which is also referred to as the mobile switching center. The wireless network switch communicates with the cell control either through dedicated telephone facilities, or, through a cell-to-mobile switching center data link. The wireless network switch tracks the location of wireless units associated with that switch, and is able to provide information with respect to the location and/or availability of any particular communication device.

Figure 10:
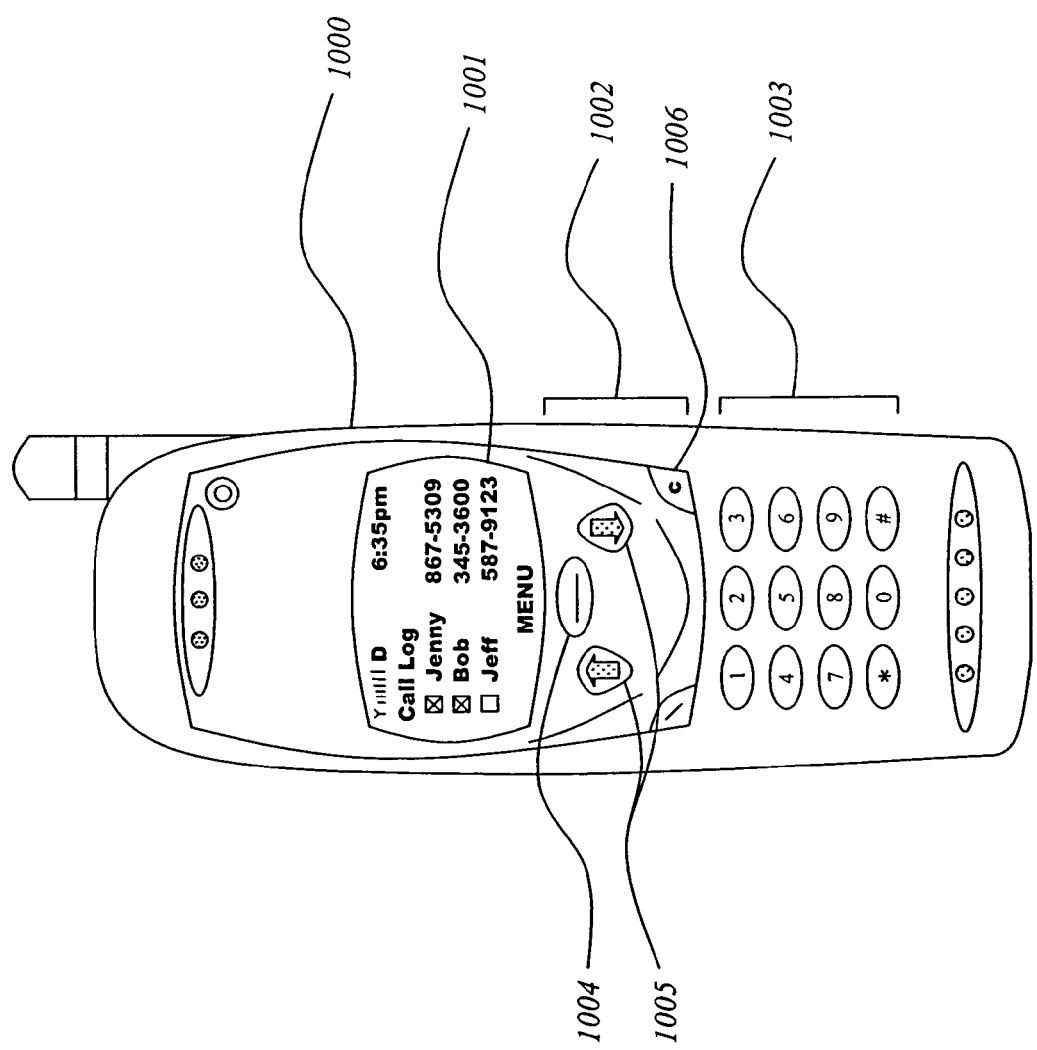
FIG. 10 is a schematic diagram illustrating a mobile communication device comprising a call-log feature.

A subscriber interface module is an interface containing the automatic conference call feature available to the subscriber. FIG. 10 illustrates one embodiment of a subscriber interface module of the present invention. The interface may be included in a Personal Information Manager (PIM), such as a landline telephone, mobile phone, caller identification (ID) module connected to a telephone, personal computer, cordless phone, personal digital assistant (PDA), or any other interface module capable of displaying a call-log. As an example, a mobile telephone 1000 comprises an LCD display 1001, a set of feature keys 1002, a set of dialpad keys 1003, a selection key 1004, and a set of arrow keys 1005 for scrolling through features displayed on the LCD display 1001. In a preferred embodiment of the present invention, the feature keys include a <conference key> 1006.

The features of the interface module 1000 include a call-log feature. As is known in the art, in a call-log, summaries are maintained of all incoming and outgoing calls in an interactive, real-time, user-accessible "call-log" portion of a call management database. The call-log allows a subscriber to know who called, when they called, which calls were missed even if no voice mail or other form of message was left, and to return calls automatically through simple buttons. Personal Identifier (PI) records are automatically updated every time a call is placed or received. The call-log database may be maintained by any of the numerous PIMs listed above. The call-log database is used to maintain a contact list. Each record in the contact list has a PI number, usually the party telephone number, associated with it that can be used to initiate a conference call by selecting the desired PIs and conferencing. Caller identification (ID), as is commonly known in the art, is used to identify outside callers and this information is recorded in the call-log database. Caller ID is a subscriber service which typically provides the telephone number and household name information about a calling party to a called party before the call is answered. Basic call related information is transmitted from the local telephone company to the called party while the called party's telephone is in a hung-up or on-hook state, e.g., between the first and second rings. The caller ID information is stored in a call-log database which may be accessed using the feature 1002 and selection keys 1004 of the PIM.

Referring again to FIG. 10, the mobile phone 1000 displays the call-log on the LCD display 1001. The user of the phone activates the telephone keys to control the operation of the mobile phone 1000. For example, the user activates the dialpad keys 1003 to dial a telephone number for an outgoing telephone call. The user may scroll through the call-log and select desired conference call participants. In one embodiment, when a subscriber selects a conference participant, the <select key> 1004 is activated which stores the selected party's directory information. When all parties to the conference call have been selected, the user activates the <conference key> 1006, from above, to initiate a conference call. In an alternative embodiment, the conference call feature of the present invention is selected using a feature key, which may perform multiple functions on the telephone. Any key on a PIM may be programmed to carry out a <select key> 1004 and/or <conference key> 1006 function. The subscriber interface detects the activation of the conference feature, and reports selected key activations to the PSTN 100 or PBX 126. In addition, the user interface generates messages to the LCD display 1001, such as a message indicating that a conference call is in progress and indicating the number and personal identification information of the parties involved in the call. A further feature may include a time quantity displayed, indicating a real-time measurement of the time involved in a conference call.

In summary, the present invention provides an easy to use method to automatically establish a conference call using the call-log feature of a communication device. When a conference call is desired by a subscriber, using a communication device, the subscriber simply selects the call-log feature and views it on the devices LCD display. The subscriber then scrolls through the call-log and selects desired invitees. When selected, the subscriber next initiates the automatic conference call feature by actuating the <conference key>, or like activating key. As stated above, the <conference key> may comprise a key designated solely with a conference function, or, the conference function may be one of multiple features activated by a single key The selected call-log directory information is sent to and received by the Provisioning module 200. The Provisioning module captures the conference participant phone numbers selected on the call-log display, and creates the Conference Record 400, which is stored in Data store 210 in an "immediate conference queue". The Scheduler 225 then reads the queue and forwards an immediate Conference Message 500 to the CCM 230, and processing continues according to FIG. 9 (for a message type 3 [immediate] Conference Message 500.

In response to the ringing of their communication device, the invitees then have the option of either answering the call and joining the conference call, or, ignoring the call and opting not to join. There is a generation and transmission of ringing signals to the attendee units associated with the call-log directory numbers of the list accessed by the subscriber's device 105, which provides indications to attendees positioned at the attendee devices to take their respective communication devices off-hook. When taken off-hook, the present invention automatically conferences the selected attendee devices together with the initiating subscriber device 105. In one embodiment, the present invention includes a signal to all invitees, which may be displayed on their communication device, that they are invited to participate in a conference call. The embodiment may further include the ability to display to the invitee all parties invited to participate, and, which parties are currently participating in the conference call. Once a party is participating in a call, the connection to their device is terminated when that party disconnects. The disconnection may be made by the subscribing party or by the answering party.

Various embodiments of the present invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

What is claimed is:

1. A telecommunications system for automatically establishing a conference call, comprising:
   a service node operative to
      receive an indication of at least one conference call participant selected from a call-log associated with a communication device;
      capture a directory number associated with the at least one conference call participant and create a conference record;
      maintain conference containers indicative of how the conference record will be processed, wherein there are at least two said conference containers to contain, respectively, conference records for conferences to be established immediately and conference records for conferences to be established at a later time;
   a data store operative to
      receive conference logistics;
   a profile database operative to
      receive participant profile data; and
   the service node further operative to
      allocate a conference bridge port for the at least one conference call participant in accordance with the received conference logistics; and
      connect a communications switch port to the allocated conference bridge port for the at least one conference call participant to establish the conference call.

2. The system of claim 1, wherein the conference logistics comprise a start date, a connect time, and a conference participant address.

3. The system of claim 2, wherein the connect time comprises an immediate connect time.

4. The system of claim 2, wherein the service node allocates a bridge port in accordance with the conference participant address.

5. The system of claim 1, wherein the participant profile comprises a participant identifier and a current address.

6. The system of claim 5, wherein the current address comprises at least one of a telephone number, a text name, and an internet protocol address.

7. The system of claim 5, wherein the service node is further operative to update the conference participant address with the current address.

8. The system of claim 7, wherein the conference participant address and the current address each comprise at least one of a telephone number and an internet protocol address.

9. The system of claim 1, wherein the communication device receives caller identification information which is stored in the call-log.

10. The system of claim 1, wherein the participant profile data comprises at least two of: a current address, a home address, an office address, and a wireless address.

11. The system of claim 1, wherein the service node connects a communications switch port to the allocated conference bridge port in accordance with a start date and a connect time reflected in the conference logistics.

12. The system of claim 1, wherein the data store receives conference logistics by receiving subscriber input to a dual tone multiple frequency (DTMF) menu.

13. The system of claim 1, wherein the data store receives conference logistics by receiving a formatted file comprising labeled conference provsioning information.

14. The system of claim 1, wherein the data store receives conference logistics by receiving subscriber input to a form displayed on the communication device.

15. The system of claim 1, wherein the directory numbers displayed on the call-log are input into the profile database using a caller identification (ID) feature.

16. The system of claim 1, wherein the directory numbers from the call-log comprise incoming calls received by the communication device and outgoing calls placed by the communication device.

17. The system of claim 1, wherein the conference containers indicate whether the conference record should be allocated the conference bridge port and connected immediately, whether the conference record should be allocated the conference bridge port only, or whether the conference record should be connected only.

18. A computer readable medium having stored thereon computer-executable instructions for performing a method for automatically establishing a conference call, wherein the method comprises:
   receiving an indication of at least one conference call participant selected from a call-log associated with a communication device;
   contacting a provisioning module;
   capturing a directory number associated with the at least one conference call participant and creating a conference record;
   receiving conference logistics;
   receiving participant profile data;
   maintaining conference containers indicative of how the conference record will be processed, wherein there are at least two said conference containers to contain, respectively, conference records for conferences to be established immediately and conference records for conferences to be established at a later time;
   allocating a conference bridge port for the at least one conference call participant in accordance with the received conference logistics; and
   connecting a communications switch port to the allocated conference bridge port for the at least one conference call participant to establish the conference call.

19. The computer-readable medium of claim 18, wherein the conference logistics comprise a start date, a connect time, and a conference participant address.

20. The computer-readable medium of claim 19, wherein the connect time comprises an immediate connect time.

21. The computer-readable medium of claim 19, wherein allocating a bridge port is performed in accordance with the conference participant address.

22. The computer-readable medium of claim 18, wherein the participant profile comprises a participant identifier and a current address.

23. The computer-readable medium of claim 22, wherein the current address comprises at least one of a telephone number, a text name, and an internet protocol address.

24. The computer-readable medium of claim 22, wherein the method further comprises updating the conference participant address with the current address.

25. The computer-readable medium of claim 24, wherein the conference participant address and the current address each comprise at least one of a telephone number and an internet protocol address.

26. The computer-readable medium of claim 18, wherein the communication device receives caller identification information which is stored in the call-log.

27. The computer-readable medium of claim 18, wherein the participant profile data comprises at least two of: a current address, a home address, an office address, and a wireless address.

28. The computer-readable medium of claim 18, wherein connecting a communications switch port to the allocated conference bridge port takes place in accordance with a start date and a connect time reflected in the conference logistics.

29. The computer-readable medium of claim 18, wherein receiving conference logistics comprises receiving subscriber input to a dual tone multiple frequency (DTMF) menu.

30. The computer-readable medium of claim 18, wherein receiving conference logistics comprises receiving a formatted file comprising labeled conference provisioning information.

31. The computer-readable medium of claim 18, wherein receiving conference logistics comprises receiving subscriber input to a form displayed on the communication device.

32. The computer-readable medium of claim 18, wherein the directory numbers display on the call-log are input into the profile database using a caller identification (ID) feature.

33. The computer-readable medium of claim 18, wherein the directory numbers from the call-log comprise incoming calls received by the communication device and outgoing calls placed by the communication device.

34. The computer-readable medium of claim 18, wherein the conference containers indicate whether the conference record should be allocated the conference bridge port and connected immediately, whether the conference record should be allocated the conference bridge port only, or whether the conference record should be connected only.

* * * * *